Aug. 18, 1959     W. P. KENNEDY     2,900,570
CONTROL FOR HEADLIGHT BEAM SWITCHES

Filed June 25, 1956     3 Sheets-Sheet 1

INVENTOR.
William P. Kennedy

Aug. 18, 1959  W. P. KENNEDY  2,900,570
CONTROL FOR HEADLIGHT BEAM SWITCHES

Filed June 25, 1956  3 Sheets-Sheet 2

INVENTOR.
William P. Kennedy

Aug. 18, 1959   W. P. KENNEDY   2,900,570
CONTROL FOR HEADLIGHT BEAM SWITCHES
Filed June 25, 1956   3 Sheets-Sheet 3

INVENTOR.
William P. Kennedy

United States Patent Office 2,900,570
Patented Aug. 18, 1959

2,900,570

CONTROL FOR HEADLIGHT BEAM SWITCHES

William P. Kennedy, Marietta, Ga.

Application June 25, 1956, Serial No. 593,649

8 Claims. (Cl. 315—83.1)

This invention relates to control for vehicle headlight beam switches in those cases where the headlight is furnished with two illuminating filaments with the light energizing electrical current flowing through either one or the other of two electrical circuits so as to cast either of two illuminating beams at the user's discretion, one of long range illumination and the other of short range illumination into the path of the vehicle's travel, and is particularly concerned with such a beam control device as would automatically control the illuminating range of these beams based upon the speed of the vehicle at any given moment.

With the present invention, headlight illuminating range is predicated upon the speed of the vehicle, it being apparent the slower the speed the less travel distance required to maneuver the vehicle properly in regard to forthcoming situations on the road and hence a short range illuminating beam would be sufficient at a slow speed and a long range illuminating beam would be required at a higher speed. This principle is recognized in present headlight beam control by the provision of a two circuit electrical switch which is operated by the driver's physical action and leave the choice of beam range entirely to the discretion of the driver.

It is readily apparent from observation upon any highway or city street that leaving headlight beam control entirely with the driver is both hazardous and annoying. Through the carelessness of the driver in many cases the long range beam is in use in congested city traffic with its usual slow speed and even, in some instances, when the vehicle is parked and the driver away from the vehicle.

In accordance therewith, it is among the primary objects of the present invention to provide a novel, simple, and improved device that will prevent the set use of the long range illuminating beam when a vehicle is traveling below a given speed.

Another object of the invention is to provide a device of the character set forth that will automatically change the beam range from long to short upon the reduction of the vehicle's speed beyond a given rate.

A further object of the invention is to provide a device of the character set forth that will, when the vehicle is traveling in the long beam range speed, permit the driver to change the beam range at his discretion.

It is another object of the invention to provide a device of the character set forth that will permit the driver to change the headlight range to long range illumination at a speed below the long range speed but such illumination range to be effected only as long as the driver forceably holds this position from his own exertion, the beam reverting automatically to short range upon the driver's exertion ceasing.

It is another object of the invention to provide a device of the character set forth which, when the device has automatically shortened the beam range due to a reduction in vehicle speed beyond the long range speed, will not automatically lengthen the beam range upon an increase in vehicle speed into the long beam range speed but will require the attendance of the driver to place the beam back into the long range position.

It is another object of the invention to provide a device of the character set forth that is readily interchanged with present headlight control systems, particularly in reference to automobiles and trucks, with a minimum of installation cost.

It is another object of the invention to provide a device of the character set forth that is housed entirely within the passenger compartment of a vehicle so as to avoid weather, soil, or impact damage to any part of the device and to also avoid drilling or cutting of the bulkhead of the vehicle.

Numerous other objects, features, and advantages of the present structure will be apparent from the consideration of the following specification taken in conjunction with the accompanying drawings, in which.

Figure 1:
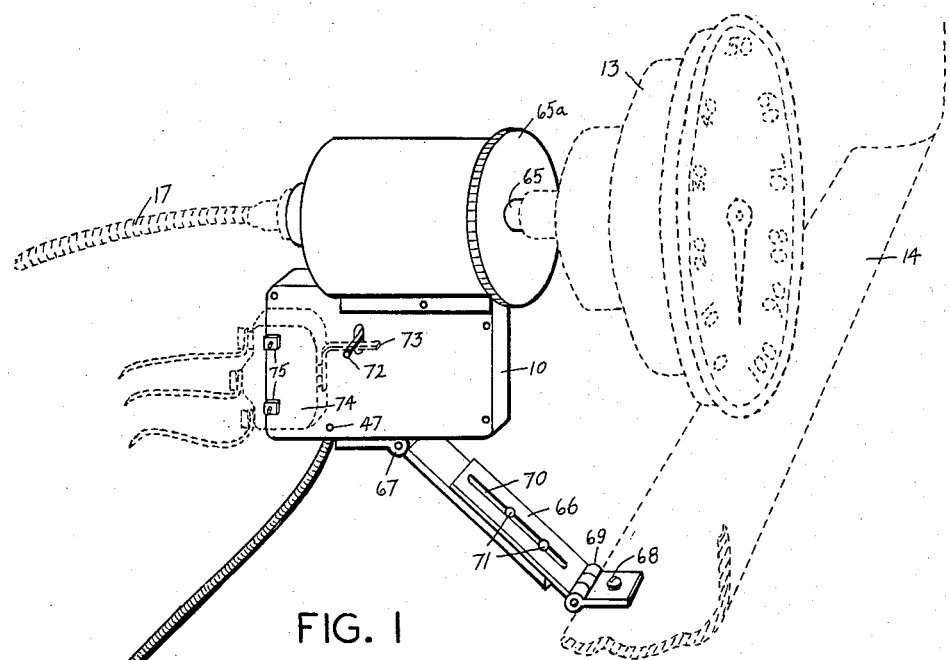
Fig. 1 is a vertical perspective view of the device shown mounted in a vehicle, in this instance an automobile passenger compartment, in association with the speedometer system and the headlight energising system.

While the present invention is capable of numerous structural embodiments, that form of the invention here presented by way of example may be generally defined as comprising a stationary casing defining a compartment for a centrifugal governor actuated by the speedometer system of a vehicle, the governor controlling the retainable positions of an arm that is in activatable association with the throw lever of a conventional single pole, double throw electrical switch that controls the circuits to two filaments in the vehicle's headlight or headlights, with foot operable means in association with the governor controlled means to afford the vehicle's driver control of the headlight circuits under specific conditions of vehicle speed.

The invention is shown herewith in conjunction with an automobile for purposes of description, it being understood the device, with minor modifications, being capable of being used in conjunction with any vehicle. It will be further understood that the present invention is not concerned with the design or structure of the conventional single pole, double throw, electric switch, such switches being commonly employed for the control of headlight beams and being familiar in structure and operation to those skilled in the art.

Referring more particularly to the drawings, that form of the present invention here presented comprises a frame 10 which holds in suitable position a revolvable shaft 11, one end 12 of which is formed to connect to the propelling fitting of a speedometer 13 mounted on a dash 14 of a vehicle. The other end 15 of the shaft 11 is formed to connect to the speedometer propelling end 16 of a speedometer cable 17. Thus the shaft 11 will revolve with the same speed and force that the speedometer cable will revolve with and will in turn properly motivate the speedometer.

As there are many minor variations in the manner of connecting speedometer cables to speedometers, the exact illustration shown herein is by way of example only. It is also apparent that the frame 10 with its shaft 11 could be interconnected any place in the speedometer cable's length, from its beginning point to the terminal position as shown herein or at any point between.

Figure 2:
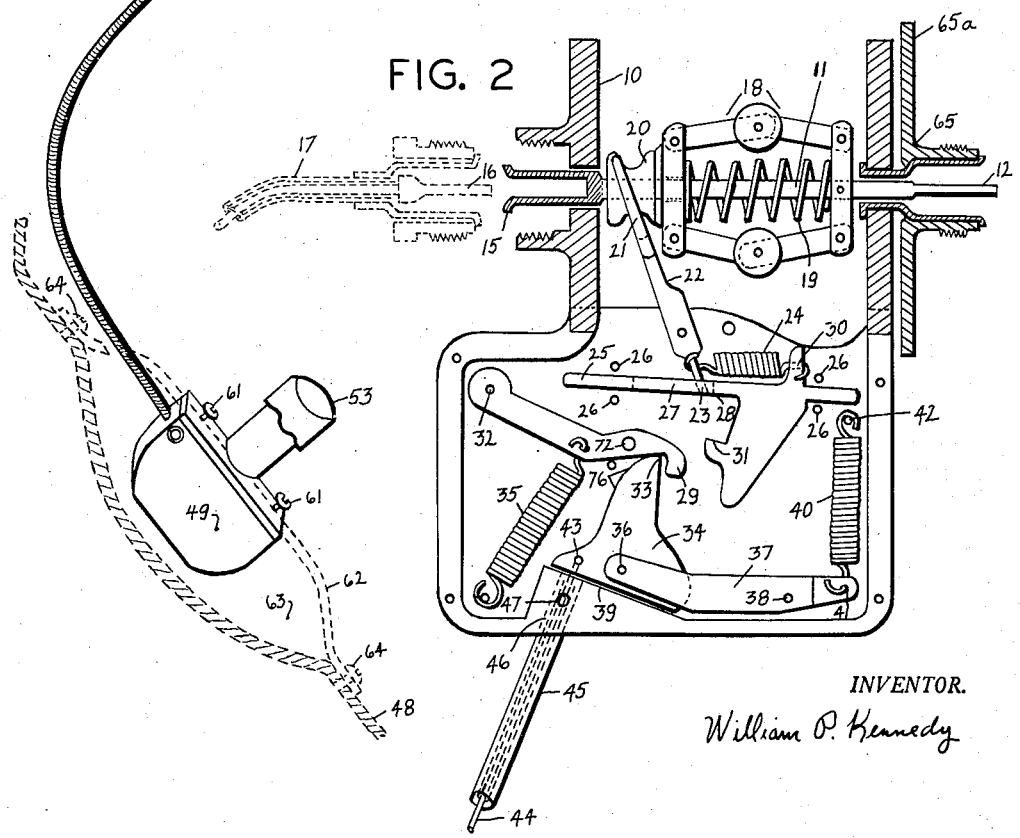
Fig. 2 is a vertical sectional view of a side position of a part of the device showing details of construction of the governor controlled switch controlling mechanism.
Figure 3:
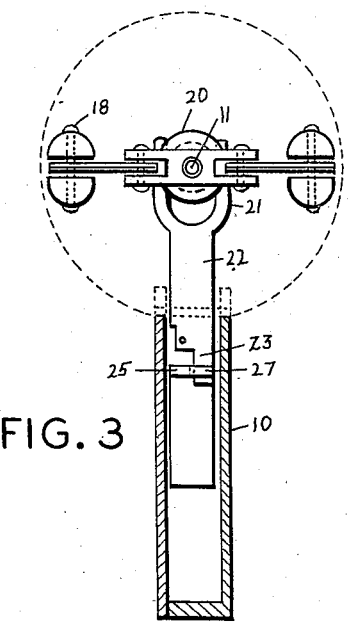
Fig. 3 is a vertical sectional view of the governor controlled switch controlling mechanism showing from one end the governor and some of its associated parts.
Figure 4:
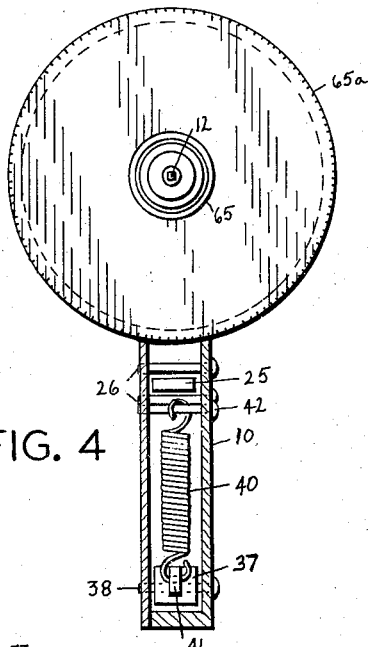
Fig. 4 is a view similar to Fig. 3 showing further detail and particularly the hand manipulative means of attaching this portion of the device to a speedometer without the use of tools.
Figure 6:
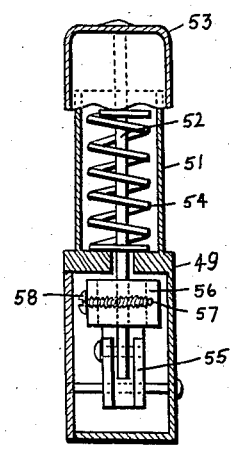
Fig. 6 is a vertical sectional view of Fig. 5 from one end.
Figure 5:
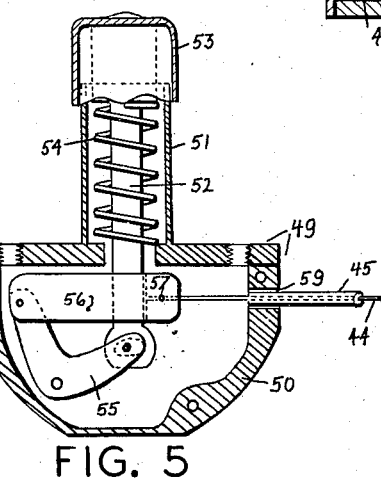
Fig. 5 is a vertical sectional side view of a portion of the device showing its foot operated component.
Figure 7:
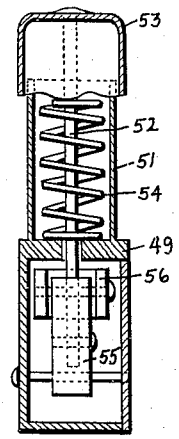
Fig. 7 is a vertical sectional view of Fig. 5 from the opposite end.
Figure 8:
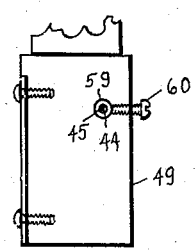
Fig. 8 is a fragmentary view of a portion of Fig. 6 showing cable stationing means and housing cover-plate attachment means.
Figure 11:
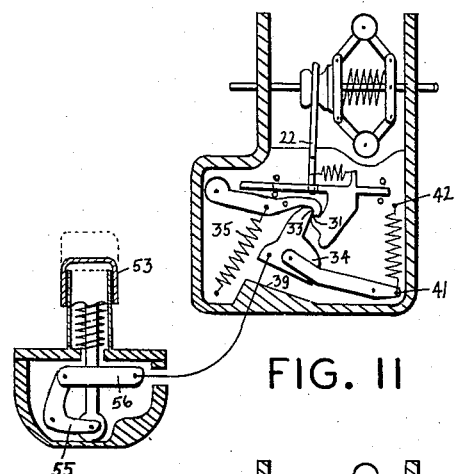

Mounted on the shaft 11 is a flyball governor 18, held in the position shown in Fig. 2 by the expansion spring 19 and taking proportionally any position between this position and the position shown in Fig. 11 as a result of the speeds of revolution caused by propulsion of the speedometer cable. A suitably flanged wheel 20 moves a yoke 21 on one end of a lever 22 to positions determined by the speed of the governor 18. Connected to the other end 23 of the lever 22 by means of a tension spring 24 is a slideable bar 25 held in proper spaced relationship to other coacting parts of the device by means of the protrusions from the frame as shown at 26. An elongated notch 27 is provided in one side of the bar 25 to permit sliding movement in one direction in relation to the lever end 23, such movement being precluded in the other direction in reference to the lever end 23 by means of the termination of the notch 27 at 28. This arrangement provides for movement of the bar in the direction of the lever catch 29, when the governor is in high speed range, by means of the connection of the spring 24 to the lever end 23 and a lug on the bar at 30. Movement of the bar in the other direction is effected by the slowing of the governor which forces the lever end 23 against the notch termination 28 and thereby moves the bar in a direction away from the lever catch 29. By means of this arrangement the bar 25 can be pushed in a direction away from the lever catch 29 without changing the position of, or exerting a strain on, the governor 18 or the lever 22.

Figure 12:
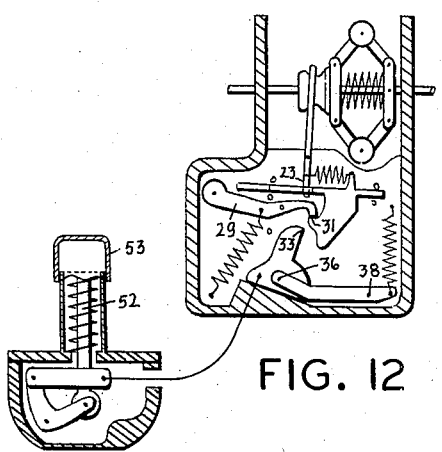

Integrally a part of the bar 25 is an extension thereof having a formed projection thereon to act as a slideable catch 31. This catch will retain the lever catch 29 in a position as indicated in Fig. 12 provided the governor is turning at a sufficient speed to place the bar in this position. The lever catch is pivotally mounted on the frame 10 at 32 and is constantly urged toward the tip 33 of a movably mounted fitting 34 by means of the tension spring 35. The fitting 34 is pivotally mounted at 36 to one end of a forked lever 37 which is pivotally mounted to the frame 10 at 38. One end of the lever 37 is urged to a seated position on the frame shoulder 39 by means of a tension spring 40 connected to the lever 37 at its opposite end 41 and to the frame 10 at 42. The fitting 34 is provided with a hole 43 to which is connected an L-shaped bend in one end of a slideable wire 44 located in a flexible housing 45 attached to and through the frame shoulder 39 at a hole 46 and stationed with a set bolt 47.

Mounted suitably on the floor 48 of the vehicle in a recess that normally houses the present electrical headlight range switch as indicated in Fig. 1, is a foot operated assembly 49 the purpose of which is to transfer motion of the driver's foot to a corresponding motion in a different direction of the slideable wire 44 through its housing 45 to activate its associated lever 37. As it is desirable to have maximum freedom from friction of the wire 44 in regard to its movement in its housing 45, the elimination of various housing bends is accomplished by having the motion in the wire originate and continue in a plane parallel with the floor of the vehicle and in such position that the housing would lie substantially in proximity to the floor at this point. As indicated in Fig. 1, the housing 45 has only one bend, it being a relatively long and sweeping curve which minimizes friction and permits the wire to slide easily within the housing.

The assembly 49 is of a size and shape that makes it suitable to be interchanged with the foot operated electrical switch now in use on automobiles and trucks for changing beam ranges of headlights.

The assembly 49 embodies a frame 50 on which is mounted a rigid tube 51 within which is slideably mounted a plunger 52 connected to a cap 53 designed to be activated by the driver's foot. Urging the cap end outwardly of the frame 50 is an expansion spring 54. This spring coacts with spring 40 in the frame 10 to assure ample force to return the fitting 34 to a properly seated position on the shoulder 39 of frame 10 after each foot activation by the driver of the cap 53. Depressing the plunger 52 causes a pivotal movement of a forked lever 55 which in turn causes a thrust on a forked bar 56 which imparts a thrust on the attached wire 44 in the housing 45, said thrust being imparted thereby to the fitting 34. Releasing the plunger creates an opposite action. The wire 44 is attached to the bar 56 by means of a hole 57 in one end of the bar, said hole running parallel with the bar's length, the wire's end inserted therein and clamped securely by means of the set screw 58. This arrangement makes possible accurate responsive movement between the fitting 34 and the plunger 52. The end of the housing 45 is held in relation to the frame 50 by being contained in a hole 59 by means of clamping action of the set screw 60.

The assembly 49 is mounted by means of the bolts 61 to the underside of a plate 62 which covers a depression 63 in the floor 48 of a vehicle, said cover plate being attached to the floor by means of the bolts 64. The frame 10, in addition to being supported by its shaft connection 12, which is effected by the threaded fitting 65 screwing into a matching aperture on the speedometer, is further stabilized by the adjustable strut 66. This strut is pivotally mounted to the frame 10 by means of the hinge 67 and is mounted at its opposite end to the flange of the vehicle's dash 14 by means of a bolt 68 through a hinge 69. Length adjustment of the strut 66 being provided by the channel 70 as moved in relation to the bolts 71 which are tightened to secure when the adjustment is suitably made. This arrangement of parts relieves the shaft 11 of any side thrust when the cap 53 is foot activated and its adjustment features allow considerable latitude of suitably mounting the frame 10 in relation to varying positions of speedometers in regard to their position on a dash as would be found in different makes of vehicles. The fitting 65 incorporates a flange 65a of larger diameter than the frame 10 at this point so as to be readily grasped by hand so as to obviate the use of tools when connecting the fitting 65 to the speedometer 13.

Mounted on one side of the lever catch 29 and moving therewith is a projecting bar 72. This bar is in contact with and activates the lever 73 of a single-pole, double-throw electrical switch 74 fastened suitably to one side of the frame 10 by means of the bolts 75. This switch controls the circuits to the headlight filaments, the lever 73 in up position energising the long range beam with the short range beam off and in down position energising the short range beam with the long range beam off. In practice on existing vehicles, the three electrical conduits presently attached to the foot operated electrical beam range switch would be simply transferred in proper order to the switch shown in association with the device.

Referring particularly to Figs. 9 through 14, and using a hypothetical vehicle speed of say thirty miles per hour as a desirable point below which the long range light beam would not energize unless forcibly held in that range by the user, and with the action of the governor set to respond correctly at that speed, such response being controlled by means of using a spring 19 of suitable expansion pressure, or the proper selection of flyball weight, or both, it can be seen that centrifugal force of the flyballs will cause the bar 25 to move to and fro in a degree proportionate to the speed the vehicle is traveling.

Figure 9:
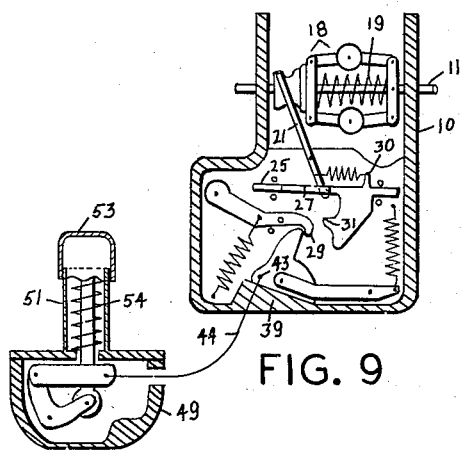
Figs. 9 through 14 are vertical sectional side views in reduced scale and simplified representation of the device to show more clearly its operation.
Figure 10:
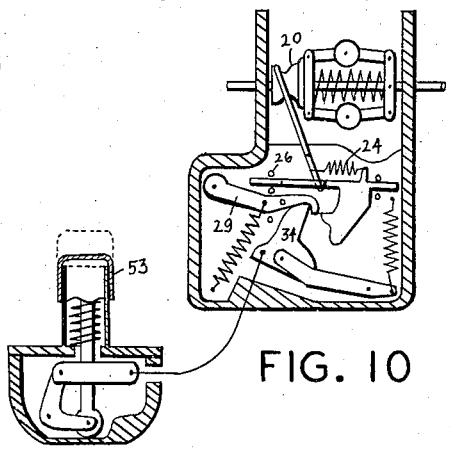

Fig. 9 would represent the positions of the device's control components at a time when the vehicle was stopped or traveling slowly. In such a situation the lever catch 29 is down, urged by its spring, and hence the headlight beam is at short range. As shown by Fig. 10, the depression of the cap 53 will lift the lever catch 29 because of the upward movement of the fitting 34 and thus the headlight beam switches to long range. However, upon release of the cap 53, the lever catch returns to its former position as shown in Fig. 9 because the speed of the vehicle is not sufficient to cause the governor to move the catch 31 into a position sufficient to keep the lever catch in its top position.

When the vehicle travels at a higher rate of speed, the governor moves the catch 31 to a position proximate to the lever catch and if the cap 53 is depressed under that condition, as shown in Fig. 11, the catch 31 will retain the lever catch in up position as shown in Fig. 12 and the long range beam lights will be on.

Figure 13:
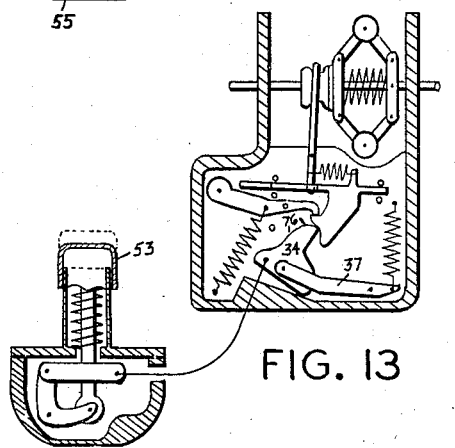
Figure 14:
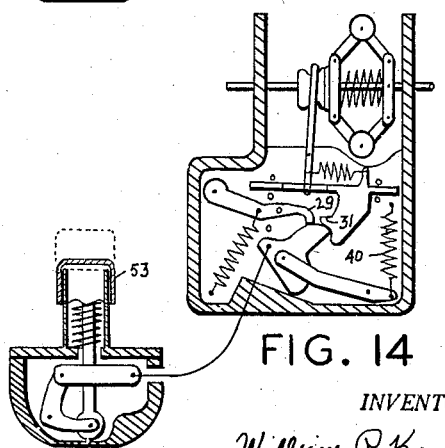

The fitting 31 is selective in its action, when seated on the shoulder 39 its upper tip 33 is always in a position to receive the catch on the lever catch 29 when the lever catch descends, as shown in Figs. 9 and 12. Upward thrust by means of foot pressure on the cap 53 will raise the fitting but it still retains its position under the lever catch because of its restraint, as shown in Fig. 10. However, if the catch 31 is in latched position, as shown in Fig. 12, depressing the cap 53 will not only cause the fitting 34 to lift but also to tilt because of lack of restraint by the lever catch and because of the pivoted mounted of the fitting 34 as shown in Fig. 13. Further depression of the cap will force the latch 31 away from the catch on the lever catch 29, as shown in Fig. 14, permitting the lever catch to revert to the position shown in Fig. 9. The fitting 34 immediately takes its seated position on the shoulder 39 after this action, its curved configuration at 76 sliding over the tip of the lever catch 29 easily. This action does not effect the governor as the rearward travel of the bar 25 causes no contact with the lever tip 23 because of the notch 27, the spring 24 taking the movement. This action describes the provision for going from long to short range beam at the driver's discretion when the vehicle is in long range beam speed.

If the vehicle is in long range beam speed, as shown in Fig. 12, and slows to below the critical point, the governor will withdraw the catch 31 from the lever catch 29 and automatically shorten the beam, as shown in Fig. 9.

From the foregoing description it can be seen that in practice, a driver, with his vehicle at rest or traveling below the set critical speed, would, upon turning on the headlights find his short range beam energized. He would be able, in this situation, to effect ignition of the long range beam but only so long as he exerts pressure on the foot activatable cap. When his vehicle speed goes above the set critical speed, his pressure on the cap will ignite the long range beam and hold it ignited. While traveling in this higher speed range, depression of the cap will revert the beam to short range, again depressing the cap will place the beam in long range and this condition will prevail as long as the vehicle is in this speed range. However, if the speed of the vehicle drops below this range, the device will automatically extinguish the long range beam and ignite the short range beam, and will not hold the ignition of the long range beam if the cap is depressed in the lower speed range unless forcibly held in that position by the driver.

In the practice of the invention, it will be understood that the device is not limited to the specific structural details and arrangements herein presented but that numerous changes, modifications and the full use of equivalents may be resorted to in the practice of the invention without departing from the spirit or scope of the appended claims, and although the specification refers particularly to a headlight with two interchangeably ignitable range filaments, it is apparent the device is equally effective in those cases where separate headlights with single filaments are used in combination to produce the same results as a single headlight with two filaments.

I claim:

1. A device for operating a beam selector switch for motor vehicle headlights including, a switch actuating lever selectively movable between a plurality of switch controlling positions to selectively actuate the switch for pre-selected circuit control, control means for moving said lever to and from said positions to actuate said switch for pre-selected circuit control, and speed responsive means operable to retain said lever in one switch controlling position.

2. A device for operating a beam selector switch for motor vehicle headlights including, a switch actuating lever selectively movable between a plurality of switch controlling positions to selectively actuate said switch for pre-selected circuit control, control means for moving said lever to and from said positions to actuate said switch for pre-selected circuit control, and speed responsive means operable to retain said lever in one switch controlling position above a predetermined speed and to release said lever from said position below said predetermined speed.

3. A device for operating a beam selector switch for motor vehicle headlights including, a switch actuating lever selectively movable between a plurality of switch controlling positions to selectively actuate said switch for pre-selected circuit control, manually operable control means for moving said lever to and from said positions to actuate said switch for pre-selected circuit control, and speed responsive means operable to retain said lever in one switch control position during a predetermined range of speeds and to release said lever from said position as a result of departure from said predetermined range of speeds.

4. A device for operating a beam selector switch for motor vehicle headlights including, a switch actuating lever selectively movable between a plurality of switch controlling positions to selectively actuate said switch for pre-selected circuit control, manually operable control means for moving said lever to and from said positions to actuate said switch for pre-selected circuit control, and speed responsive means operable to retain said lever in one switch control position during a predetermined range of speed and to release said lever from said position as a result of departure from said predetermined range of speeds, said control means benig operable to release said lever independently of said speed responsive means.

5. A device for operating a beam selector switch for motor vehicle headlights including, a switch actuating lever selectively movable between a plurality of switch controlling positions to actuate said switch for pre-selected circuit control, selectively operable control means for moving said lever to and from said positions to actuate said switch for pre-selected circuit control, and speed responsive means operable to retain said lever in one selected position during a predetermined range of speeds and to release said lever from said position as a result of departure from said predetermined range of speeds, said control means being operable to release said lever from retention and to restore said lever to said retained position both independently of said speed responsive means.

6. A device for actuating a beam selector switch for motor vehicle headlights, said switch having an actuating arm movable to and from a first position for energizing a high beam circuit and a second position for energizing a low beam circuit, said device including a lever engageable with said arm, manually operable means to selectively move said lever to shift said arm from said first position to said second position and from said second position to said first position, speed responsive means to retain said lever in position to secure said arm in high beam circuit energizing position during high speed vehicle operation and to release said lever from such retention at low speed vehicle operation, said manually operable means being operable to release said lever independently of said speed responsive means.

7. A device for actuating a beam selector switch for automobile headlights including, a switch control lever, selectively operable means for moving said lever to a selected position, a catch engageable with said lever to retain said lever in said selected positions, and speed responsive means to move said catch to and from lever engaging position, said manually operable means being operable to release said lever from said catch independently of said speed responsive means.

8. A device for actuating a beam selector switch for automobile headlights including, a switch control lever, manually operable means for moving said lever to a selected position, a catch engageable with said lever to retain said lever in said selected position, and speed responsive means to move said catch to and from lever engaging position, said manually operable means including a foot controlled member and a pivoted fitting engageable with both said lever and said catch, said fitting being operable to release said lever from said catch independently of said speed responsive means.

References Cited in the file of this patent
UNITED STATES PATENTS

| | | |
|---|---|---|
| 2,048,715 | Sorensen | July 28, 1936 |
| 2,572,144 | Healy | Oct. 23, 1951 |
| 2,685,048 | Schweitzer | July 27, 1954 |
| 2,749,478 | Gandelot | June 5, 1956 |
| 2,807,752 | McIlvaine | Sept. 24, 1957 |
| 2,758,172 | Kromholtz | Aug. 7, 1958 |